United States Patent Office 3,620,074
Patented Nov. 16, 1971

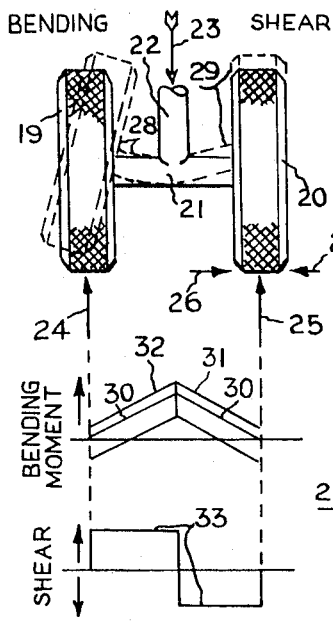
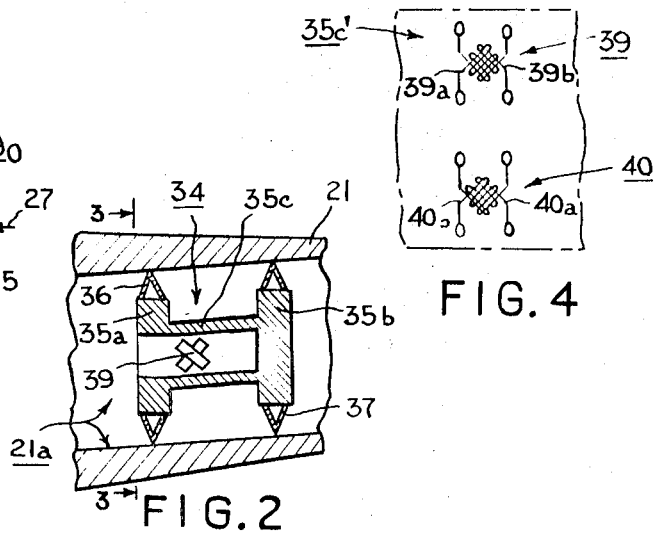
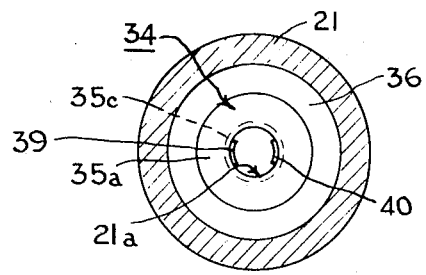
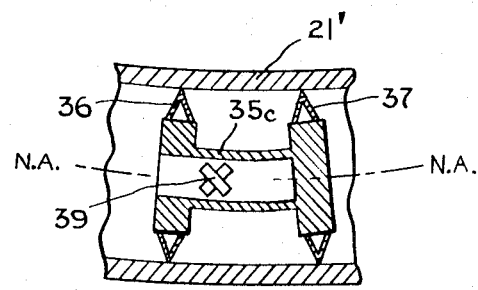
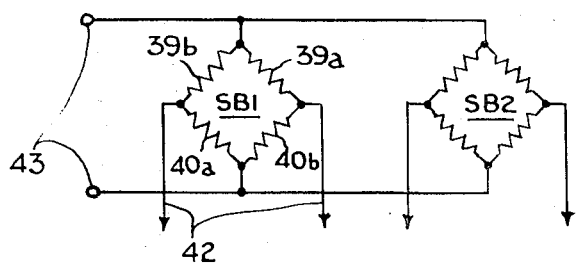
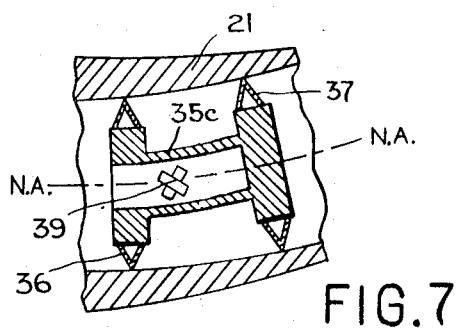

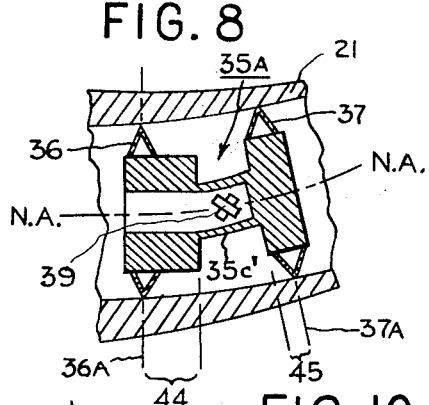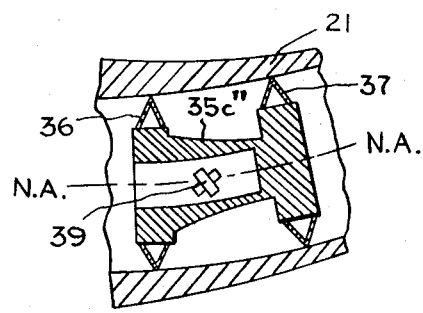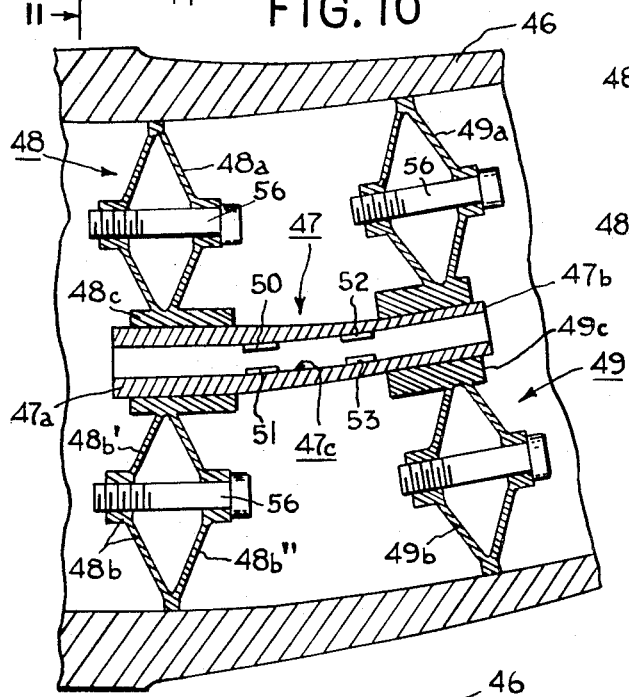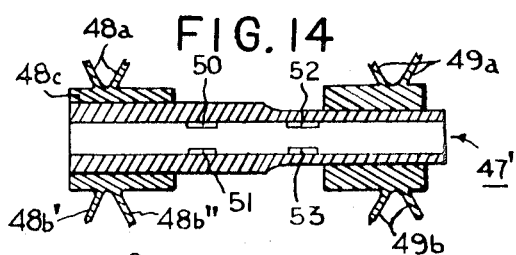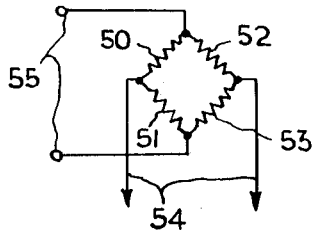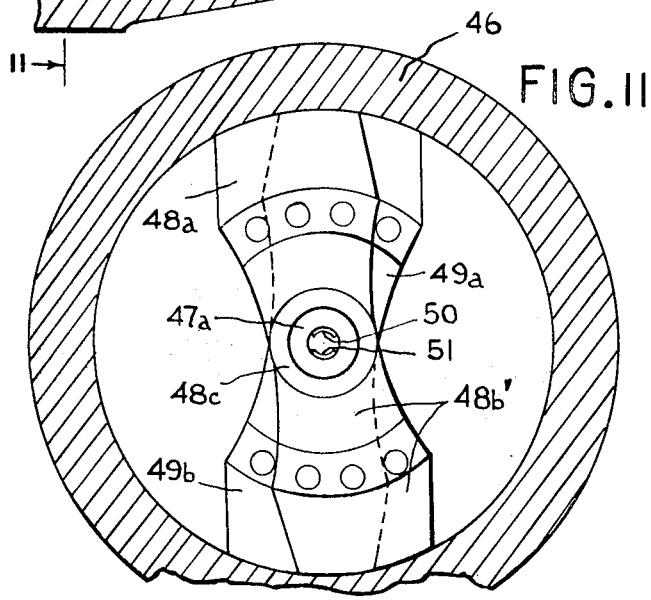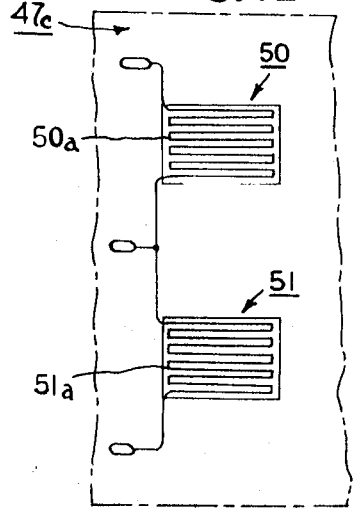

3,620,074
SHEAR-TYPE TRANSDUCERS COMPENSATED FOR EFFECTS OF NON-UNIFORM BENDING
Eric Laimins, Belmont, and Harry E. Lockery, Sudbury, Mass., assignors to BLH Electronics, Inc., Waltham, Mass.
Filed Jan. 19, 1970, Ser. No. 3,719
Int. Cl. G01l 5/12
U.S. Cl. 73—141 A
6 Claims

ABSTRACT OF THE DISCLOSURE

A shear-responsive strain gage transducer, mounted at spaced positions along a load-carrying member to characterize shear and the related loading, but also tending to develop error because of non-uniform bending of the load-carrying member, is structed for inherent mechanical suppression of bending-induced outputs which would not otherwise be electrically self-cancellable; in the case of a preferred weight-characterizing shear-type transducer colleted at two longitudinally-spaced positions inside a hollow non-uniform axle of an aircraft landing gear, the colleted elastically-deformable sensing element carrying the strain gages has an asymmetry of proportions and/or longitudinal orientation which reduces to insignificant amounts any shear-induced displacements resulting from the particular non-uniform bending of that non-uniform axle.

BACKGROUND OF THE INVENTION

The present invention relates to improvements in precision measurements of loadings such as those which are effective at the wheels of aircraft and the like, and, in one particular aspect, to novel and improved on-board aircraft weighing transducers of an advantageous shear type having structural provisions which physically offset otherwise noncancelling and unwanted responses occasioned by non-uniform bending such as that experienced by axles of non-uniform thickness.

It has been known to measure total aircraft weight, and to calculate center of gravity, through practices which involve sensing of weight at the site of each of the aircraft supports upon the ground. Early efforts involved accessory weighing jacks, platform-type scales, or direct gaging of support struts, and more recent developments have included "on-board" sensors associated with the wheel axles and built in as part of the craft, along with the cooperating circuitry and instruments which calculate and display weight and C.G. for purposes of safe and efficient aircraft operation. As a practical matter, even the most modern on-board techniques are found to be in need of improvement in terms of accuracy, especially as to avoidance of errors due to responses to certain extraneous forces other than those representing solely the craft weight. In particular, there are often disturbing responses to certain side loadings due to such factors as tight turns, wind, apron discontinuities or slopes, and uneven tire wear or inflations. The allowable margin of error in calculations of aircraft center of gravity is sometimes exceedingly small, because of the great hazards which can result from faulty information as to its whereabouts in what is invariably a very limited permissible range to begin with on many crafts.

In accordance with certain aspects of the recognitions and teachings of the invention of U.S. Pat. No. 3,426,586, assigned to the same assignee as that of the present application, on-board transducers of a strain-gage type may be caused to respond with outsianding precision to those loading forces which produce shear effects in wheel axles of aircraft landing gear. The intended result is that the transducer responses should accurately characterize true weight reactions, because these can be very well isolated from the unwanted forces, which fortunately evidence themselves as bending rather than as the shear being measured. Isolation of shear is promoted by mounting a gaged shear-responsive element upon a wheel axle by way of spaced fitted collets, preferably by collets which are in substantially a line contact with the axle. One suitable shear-responsive element includes a deformable tubular member equipped internally with strain gages intended to characterize only the shear effects caused by the weight, the gages either being of the crossed type or being in a differential-bending arrangement so that shear responses are optimized. Transducers which may be quite accurate for measurements within axles exhibiting very uniform cross-sections along the regions of the transducers are nevertheless unfortunately found to be subject to vexing errors, mainly due to unwanted responses to bending rather than shear effects, when the axles are physically non-uniform or are effectively non-uniform because of influences of other nearby or surrounding members. The present teachings enable these errors to be satisfactorily overcome, by way of transducers which are mechanically structured to eliminate unherently those bending-induced responses, such as those associated with their use with non-uniform axles, which cannot be cancelled electrically.

SUMMARY OF THE INVENTION

It is one of the objects of the present invention, therefore, to provide novel and improved strain-gage transducers which cooperate with vehicle axles and which are uniquely structured in relation to the axles to perform precise measurement of wheel reactions in the vertical weight-related directions, independently of side loadings and accompanying unwanted bending-moment effects, particularly with axles of non-uniform cross-section.

Another object is to provide a unique shear-responsive transducer which is mounted in fixed relation to load-carrying structure of non-uniform characteristics rendering it non-uniform in bending, and which has physical asymmetry causing it to undergo bending in the manner of the load-carrying structure, to effect inherent cancellations of unwanted bending-induced reactions.

Still further, it is an object to provide an improved on-board aircraft transducer of low-cost construction which is of proportions and orientation producing physical asymmetry by which erroneous responses due to non-uniform bending of an associated axle are suppressed.

By way of a summary account of practice of this invention in one of its aspects, the weight supported by each wheel of an aircraft is detected by a strain-gage transducer mounted within the tapered hollow axles of non-uniform thickness associated therewith; the elastically-deformable sensing element for the transducer is supported at longitudinally-spaced positions by a pair of collet members, and is equipped with surface strain gages disposed and electrically interconnected to characterize shear effects in the axle. The sensing element, which may itself conveniently be of hollow tubular form, also, is intentionally caused to possess a physical asymmetry, effective in a special way when it undergoes bending along with the axle to which it is fixed. This asymmetry is matched with that of the non-uniform axle, in that the sensor element thereby exhibits substantially no shear attributable to bending of the axle along with which it necessarily bends because of its mounting. Asymmetry of that character is achieved by way of a sensor element cross-section varying either continuously or discontinuously in the axial direction, or by way of appropriate axial displacement of the sensor element from a mid position relative to its spaced supports, by way of its fabrication of materials having different moduli of elasticity, or by way of supports via collets of different strengths, for example, or by combinations of such factors. The strain gages bonded to the sensor element respond both to bending and pure shear effects, but, due to the combined effects of properly interconnecting the gages in a bridge circuit which tends to cancel bending responses, and of mechanically forcing the sensor element to reject tendencies to shear when the non-uniform axle is bent, the bridge circuit outputs are forced to be accurately related to the wheel reactions due to craft weight, without including error-inducing components resulting from side loadings, in particular.

BRIEF DESCRIPTION OF THE DRAWINGS

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIG. 1 illustrates an aircraft landing gear assembly in which dashed linework characterizes bending and shear deflections, together with related bending moment and shear diagrams;

FIG. 2 is a cross-section of an axle-mounted shear transducer in a non-uniform tapered hollow axle undergoing substantially pure shear;

FIG. 3 is a cross-section taken along section line 3—3 in FIG. 2;

FIG. 4 represents an inner cylindrical surface of the transducer of FIGS. 2 and 3 together with the crossed shear-responsive strain gages carried thereon;

FIG. 5 schematically illustrates bridge circuit connections for gages such as those of FIG. 4;

FIG. 6 provides a cross-section of a similar axle-mounted transducer, associated with an axle of uniform thickness undergoing substantially pure bending;

FIG. 7 provides a cross-section of the transducer and non-uniform axle of FIG. 2 undergoing non-uniform bending;

FIG. 8 is a cross-section of an improved shear transducer which physically compensates for bending effect imposed by non-uniform bending of a supoprting tapered hollow axle;

FIG. 9 is a cross-section of a tapered shear transducer which is self-compensating for non-uniform bending of the associated tapered hollow axle;

FIG. 10 provides a cross-section of a tapered transducer and axle of the general type shown in FIG. 9, together with colleting details and a longitudinal positioning feature;

FIG. 11 is a transverse cross-section of the FIG. 10 assembly taken along section line 11—11 in FIG. 10;

FIG. 12 represents an inner cylindrical surface of the transducer of FIGS. 10 and 11, together with the differential-bending gages bonded thereto;

FIG. 13 schematically illustrates bridge-circuit connections for the differential-bending gages appearing in the embodiment of FIGS. 10 and 11; and FIG. 14 provides a cross-section of a sensor of discontinuously-varying thickness, together with portions of collet mounts such as those appearing in FIG. 10.

DESCRIPTION OF THE PREFERRED EMBODIMENTS

The paired aircraft wheels 19 and 20 appearing in FIG. 1 represent part of a landing gear unit which bears some of the loading typically shared by a plurality of units in an aircraft landing gear array. Conventional tubular forms of an axle 21 and strut 22 communicate downward force 23 of the ground-supported aircraft to the wheels and thence to the underlying apron surfaces. Wheel reactions to the vertical loading are characterized by force arrows 24 and 25, and normally are about equal. In addition to the downwardly-directed forces representing the aircraft weight which is of interest for measurement purposes, the wheel reactions can be expected to involve undesirable lateral components, such as are designated by arrows 26 and 27, as the unavoidable result of such common factors as tight turns, wind loading, apron slope or irregularities, parking stresses, uneven tire inflations or wear, and the like. Resulting deflections of the halves of axle 21 reflect the effects of both bending moment and shear; bending moments tend to cause the kind of deflections designated by dashed linework 29. Bending moment varies with position along the longitudinal axis of axle 21, of course, and represents the vertical load multiplied by the distance between that position and the center of pressure of the tire on the underlying apron, plus any lateral loads multiplied by the tire radius. As has already been referred to, the side loads may vary and the radius and center of pressure, or "footprint," of the tire may change also. Bending moment plot 30 shows variations with distance, considering only the vertical load reactions 24 and 25 while they remain constant, and plots 31 and 32 characterize the net bending moments due to the combined effects of these vertical load reactions with the horizontal side loads 26 and 27, respectively. When transducers responsive to bending moments are employed, their axial positions are thus normally quite critical, and, moreover, the significant contributions due to side loadings cannot be segregated, such that the measurements can be seriously in error if they are taken to represent true craft weight. By way of important distinction, however, the shear plot 33 characterizes the forces in the vertical direction, which are the ones of interest, and which represent the vertical weight if they can be isolated from the extraneous forces.

Based upon recognitions of the latter advantages, a shear-responsive transducer 34 (FIG. 2) is disposed within each half of the hollow cylindrical axle 21 to sense and characterize only the shear effects which take place due to weight-related forces acting in the vertical direction, the axle being shown to be non-uniform because of a taper, which is exaggerated in FIG. 2 and not evident in FIG. 1. The sensing element includes spaced rigid end portions 35a and 35b on each end of an elastically-deformable tubular sensing section having relatively thin walls, 35c. The rigid end portions are each separately suspended within the tapered axle by separate annular collets 36 and 37, which preferably have firm substantially line contact engagements with the inner axle surface 21a around their peripheries. Because of their substantially triangular cross-sectional configurations, the inner peripheries of these annular collets each make secure engagements with the rigid end portions and tend to hold these end portions in fixed relation to the collets and, in turn, to the inside of the axle. These collets may be of the type described in the aforesaid U.S. Pat. No. 3,426,-586, or of an improved type described later herein, and are axially adjustable to cause radial expansions and locking within the axle. A pair of over-laid crossed resistance-type strain gages is bonded to the interior surface of the deformable tubular section 35c at each of two opposite positions along a horizontal diameter, where they will respond to shear-induced surface deformation effects exhibited at these points. In FIG. 4, wherein the cylindrical inner sensor surface, 35c', is opened out flat for purposes of illustration, one of the crossed gage units, 39, is shown to include a first resistance wire grid 39a aligned at about 45° to the longitudinal axis of the sensor, in one direction, and a second wire grid, 39b, normal to the first; similarly, the other gage unit, 40, includes the mutually-perpendicular grid wires 40a and 40b, also at about the same 45° orientations.

One of the two strain-gage bridges, SB1, in FIG. 5 is shown to include the aforementioned gages, it being understood that the companion bridges SB2 for a transducer associated with an adjoining half axle, or the like, is of course similar. The strain-gage grid-wires for each half of the pair constituting one of the gage units are connected in adjacent arms of the bridge SB1, and those grid wires which simultaneously go into either tension or compression on opposite sides of the sensor as it experiences shear are disposed in opposite diagonals of the bridge. Considering the pure shear condition depicted in FIG. 2, for example, the gage wires 39a and the diametrically-opposite gage wires 40a are simultaneously in tension while the remaining gage wires 39b and 40b are both in compression; hence the bridge output leads 42 yield an electrical output signal characterizing the vertical forces related to weight. Input leads 43 are connected with a power source in the usual manner.

Insofar as measurement of pure weight-related shear effects is concerned, it is of no concern that the cooperating load-supporting axle carrying the sensor is of the tapered non-uniform thickness. However, it is intended that unwanted bending-related effects, such as those developed by undesirable side loading, should be electrically self-cancelling in the bridge circuitry. Ordinarily, with an axle of uniform thickness, such as the axle 21' shown in FIG. 6, this electrical self-cancellation would advantageously tend to occur under bending conditions. The same sensor and colleting are there illustrated, with the same reference characters as appear in FIG. 2. Uniform vertical bending of both the axle 21' and sensor section 35c along the uniformly-bent neutral axis, N.A., would cause both gages in each unit to be tensed about the same amount, and the bridge would properly remain balanced and produce no related output. Similarly, pure bending of the neutral axis in a horizontal plane would cause both gages in one of the units 39 and 30 to be in tension, and in the other, in compression, with the like desirable result that there would be no bridge unbalance and no erroneous output.

Such self-cancellation are not fully realized when the axle is tapered or otherwise actually or effectively non-uniform in the axial direction, however. In this connection, it should be recognized that the non-uniformity may result from an actual taper or like shaping which aircraft axle manufacturers exploit for the purpose of conserving both metal and weight, while maintaining the same stresses, or it may instead be the result of surrounding sleeves, collars, and so forth, associated with bearings and the like, or may be caused by familiar "end effects" resulting from nearby thickened enlargements or their equivalents. These axle non-uniformities in the axial direction are responsible for non-uniform bending, such as is illustrated in convenient exaggeration in FIG. 7, where the axle and sensor and neutral axis, N.A., are bent little in the vicinity of the thicker lefthand part of axle 21 and are bent significantly more in the vicinity of the thinner righthand part of that axle. For such a condition, the gage responses are obviously not of the aforementioned equal amounts, and resulting bridge unbalances exhibit themselves as measurement errors. In practices involving aircraft weight and C.G. measurements, for example, errors from these effects can be significant enough to be considered seriously objectionable.

The improved arrangement illustrated in FIG. 8 is one in which the transducer sensor 34A is structured to eliminate the said difficulties stemming from non-uniform bending. Colleting of sensor within the tapered axle 21 is like that discussed above, but the sensor 34A is proportioned differently, so that its gaged elastically-deformable tubular section 35c' is displaced longitudinally toward the thinner end of the axle. For the latter purpose, the left rigid end portion 35a' is made longer than the right rigid end portion 35b', such that the tubular section 35c' is neither centered between them nor is nearer the thicker end of the axle. It should be noted that rigid ends 35a' and 35b' do not themselves bend significantly, but serve to orient the deformable tubular section in relation to the planes of collet supports, 35A and 37A. The illustrated different spacings, 44 and 45, of the supported ends of tubular section 35c' from the collet support planes 36A and 37A characterize the longitudinal offset of that tubular section in the same direction as that of the thinning of the axle 21. The specific amount of such longitudinal offset which produces the optimum intended self-cancellations may be determined empirically, or may be calculated; the self-cancellations need not be absolutely perfect to realize very important improvements however. When the offset in support of the sensor is correct, for the particular non-uniform axle with which it is associated, the confronting two inner ends of the two rigid end portions will not deflect very much in relation to one another, or at all if precisely dimensioned, when the axle is bent in pure bending. This is an unusual and perhaps surprising phenomenon, but is quite simple when recognized. If the sensor section were infinitely thin, such that the confronting inner ends of the rigid end sections substantially abutted one another, there would be no shear effect at the sensor except when the supporting axle itself undergoes shear; under bending, no shear displacement would occur, provided the lengths 44 and 45 are precisely correct for the axle in question. As has been said, it is not essential that these lengths be of the theoretically exact values, or that the sensor be infinitely thin, to obtain extremely worthwhile improvement. Accordingly, as axle 21 in FIG. 8 bends non-uniformly, the sensor 35c' undergoes very little shear on that account, and its gage units 39 and 40 do not respond erroneously by producing bridge circuit outputs when no weight-related shear effects are present.

FIG. 9 shows a sensor section 35c'' which is longitudinally centered but is itself tapered, as a counterpart of the tapering of the supporting axle 21, and in the same direction. When the sensor non-uniformity in the axle direction is by way of tapered thickness, rather than by longitudinal offset as in FIG. 8, the same results obtain, namely that there is substantially no shear evidenced in the sensor 35'' as the axle 21 undergoes bending. When the theoretically exact tapering is employed, one could slice the section transversely to the neutral axis, N.A., and yet realize no shear displacement as the result of axle bending. The degree to which the actual tapering need approach the theoretical will of course depend upon the extent of improvement required, and may likewise be achieved empirically, by installing a transducer and modifying its taper to suit the needs as shown by unwanted output responses due to bending. Preferably the taper is conical, so that bending effects in vertical and horizontal planes are suppressed, but circularity is not essential if one is primarily concerned with bending in but one of these planes. In the latter event, the taper is preferred at least in the plane of interest, of course.

The shear-responsive gaging considered thus far herein has been primarily of the crossed-gage type, preferably along the horizontal axis of a tubular transducer sensor. Another characterization of shear is available through use of so-called differential-bending gage arrangements, such as are involved in the improved transducers which are the subject of FIGS. 10 through 14. Having reference to FIG. 10, for example, the non-uniform tapered hollow axle 46 is there internally equipped with a correspondingly tapered hollow tubular sensor 47 which is elastically deformable well within expected limits of deformations. The collets 48 and 49 supporting the ends of sensor 47 in relation to the axle are of a type involving diametrically-opposite halves, 48a and 48b, and 49a and 49b, each of which is of a toggle type in that it may be axially compressed, individually, by way of an associated one of bolts 56, to expand radially and lock the sensor in place while at the same time affording opportunity for radial adjustment of the associated end of the sensor. Doubly-bowed back-to-back spring members, such as members 48b' and 48b'', promote the desired actions, but are not here specifically claimed.

Ends 47a and 47b of sensor 47 are securely held within the respective collets 48 and 49, and may either be integral with or firmly united within the central collet bosses 48c and 49c. The latter arrangement is shown, as an aid to understanding of a convenient empirical determination of optimum axial locus for the sensor. Taper is present between the ends of sensor 47, and is in the direction of axle taper. Four strain gages, 50 through 53, are bonded to interior surfaces (such as 47c in FIGS. 10 and 12) of the elastically-deformable sensor section at each of two upper and lower positions along a vertical diameter at the illustrated axially-spaced positions, where they will respond to certain tension and compression effects exhibited at these sites. The filaments of these gages are preferably substantially aligned with the central axis of the sensor, as exemplified by the filament or grid wires 50a and 51a in FIG. 12, where the inner surface 47c is opened out flat for clarity of illustration. FIG 13 represents one suitable form of bridge circuitry in which the gages may be disposed to yield the desired outputs from output leads 54 when the input terminals 55 are electrically excited in a known manner. When sensor section 47 undergoes pure shear, the gages 50 and 51 may be respectively in compression and tension while gages 52 and 53 are respectively in tension and compression, such that the bridge is unbalanced and a desired weight-related output is obtained. Ordinarily, it would be hoped that bending of the axle would cause gages 50 and 52 to be in compression by the same amount, while gages 51 and 53 are in tension by the same amount, thereby yielding no erroneous output from the bridge circuitry. However, the non-uniformity exhibited by the axle tends to cause the aforesaid amounts to differ, and erroneous outputs would occur, except that the sensor tapering now causes the outputs to be the same or substantially the same and the bridge does not develop erroneous outputs due to the non-uniform bending. In this connection, it will be recognized that the gages at the thicker sites will tend to have about the same resistance changes as those at the thinner sites when the tapered sensor section is obedient to the non-uniform bending of the tapered axle. Longitudinal pre-adjustment of the tapered sensor within sleeves 48c and 49c also effects the same type of physical self-compensation, and may be an an adjunct to the tapering or a separate provision for suppression of bending-related errors.

In FIG. 14, sensor 47' is not uniformly tapered but, instead, has a highly discontinuous change from one thickness to another, in the same sense as the change in thickness of a surrounding axle, however. Longitudinal axial orientation of sensor 47' is of course a main factor in determining the extent of physical suppression of the bending-related errors in that embodiment. Crossed gages may likewise be used to characterize shear in the embodiments of FIGS. 10 and 14.

In the case of unwanted bending-related outputs of onboard aircraft transducers of the shear type, due to troublesome side-loading effects, highly significant factors of improvement of up to between 10 and 20 to 1 have readily been realized utilizing the teachings of this invention to reject sensitivities to such side loads.

Those skilled in the art will appreciate that various modifications, substitutions and combinations may be effected within the broader aspects of this invention. By way of example, fastening or clamping may be accomplished other than by way of the described radially-expansible collets, and may, together with the sensor, be on the outside of an axle or other principal load-carrying member or structure. In the latter case, the axle need not be hollow, and one or more sensors may typically be disposed externally on longitudinally-spaced bosses, preferably in the same horizontal plane with the longitudinal axis of the non-uniform axle. Similarly, the gages need not be on the inside of a hollow sensor element, nor need the sensor element be tubular, although that is the preferred construction appropriately chosen for disclosure. The sensor element in certain alternative arrangements may instead be comparable to known transducers, such as ring-type or parallelogram-type sensing units disposed to respond only when the asymmetric support structure actutlly undergoes shear-type displacements or deformations. Moreover, the physical asymmetry which has been described, for purposes of eliminating or minimizing bending-induced responses which falsely appear to be those of shear, may be achieved utilizing materials of different strengths, either for different parts of the sensor or for the different collets: the useful effects are comparable to those realized when the sensor is thickened nearer and/or axially displaced from the site of the thicker axle region. Gaging is preferably accomplished by way of resistance-type strain gages, although other types, such as magnetostrictive or differential-transformer types, may be exploited in some designs.

What we claim as new and desire to secure by Letters Patent of the United States is:

1. Shear-responsive transducer apparatus for mounting between spaced positions at which are developed both desired shearing actions and undesired non-uniform bending actions which involve an asymmetry of less bending at one of the positions and more at the other, comprising an asymmetrical combination of an elastically-deformable sensor and means mounting said sensor between the spaced positions and exposing said sensor to the shearing and bending actions at said positions, said asymmetry of said combination comprising greater physical rigidity of portions of said combination nearer said one of said positions than that nearer the other of said positions, the portions of said combination which are of greater and lesser physical rigidity acting together in response to their exposure to said bending actions in a sense to reduce shear in said sensor, and gage means responsive to shear-induced deformations of said sensor.

2. Shear-responsive transducer apparatus for mounting between spaced positions at which are developed both desired shearing actions and undesired non-uniform bending actions which involve an asymmetry of less bending at one of the positions and more at the other, comprising an asymmetrical combination of an elastically-deformable sensor and means mounting said sensor between the spaced positions and exposing said sensor to the shearing and bending actions at said positions, said mounting and exposing means comprising substantially rigid means for supporting said sensor at each of two displaced locations and means for fastening each of said rigid means to a load-carrying structure at a different one of each of said spaced positions, said sensor extending in direction between said spaced positions and being shorter than the space therebetween, the asymmetry of said combination comprising greater rigidity of said sensor nearer said one of said positions than that nearer the other of said positions, the portions of said sensor which are of greater and lesser rigidity acting together in response to their exposure to said bending actions in a sense to reduce shear in said sensor, and gage means responsive to shear-induced deformations of said sensor.

3. Shear-responsive transducer apparatus as set forth in claim 2 wherein said sensor is thicker nearer said one of said positions.

4. Shear-responsive apparatus as set forth in claim 2 wherein the end of said deformable sensor nearer said one of said positions is at a greater distance from said one of said positions than is the opposite end from said other of said positions.

5. Shear-responsive transducer apparatus comprising a hollow vehicle axle structure which is asymmetrical in that it is of greater physical rigidity at one position than at another axially-spaced position and therefore tends to undergo less bending at said one position and more at said other position in response to bending actions, an asymmetrical combination of an elastically-deformable sensor and means mounting said sensor within said axle structure at each of said spaced positions and exposing said sensor to shearing and non-uniform bending actions of said axle structure at said positions, the physical rigidity of said combination at each of said positions and the physical orientation of said sensor axially in relation to said positions together occasioning an asymmetry of said combination by which said sensor tends to undergo non-uniform bending involving substantially no shear in said sensor when said axle structure undergoes non-uniform bending, said mounting means including radially-expansible collet means for locking said sensor in place within said hollow axle at said positions, gage means responsive to shear-induced deformation of said sensor, said gage means including strain gages bonded to said sensor and responding to load-induced surface strains thereof, electrical bridge circuitry having electrical excitation terminals and electrical output terminals, and means connecting said strain gages in said circuitry as arms thereof to unbalance said circuitry in response to deformations of said sensor induced by shear while preserving said circuitry substantially balanced in response to deformation of said sensor induced by non-uniform bending of said axle structure.

6. Shear-responsive transducer apparatus comprising an axle structure which is asymmetrical in that it is of greater physical rigidity at one position than at another axially-spaced position and therefore tends to undergo less bending at said one position and more at said other position in response to bending actions, an asymmetrical combination of an elastically-deformable sensor and means mounting said sensor with said axle structure at each of said spaced positions and exposing said sensor to shearing and non-uniform bending actions of said axle structure at said positions, the physical rigidity of said combination at each of said positions and the physical orientation of said sensor axially in relation to said positions together occasioning an asymmetry of said combination by which said sensor tends to undergo non-uniform bending involving substantially no shear in said sensor when said axle structure undergoes non-uniform bending, said mounting means including means locking said sensor with said axle structure at said positions, gage means responsive to shear-induced deformation of said sensor, said gage means including strain gages bonded to said sensor and responding to load-induced surface strains thereof, electrical bridge circuitry, and means connecting said strain gages in said circuitry as arms thereof to unbalance said circuitry in response to deformations of said sensor induced by shear while preserving said circuitry substantially balanced in response to deformation of said sensor induced by non-uniform bending of said axle structure.

References Cited

UNITED STATES PATENTS

| | | | |
|---|---|---|---|
| 2,544,738 | 3/1951 | Tint | 73—133 |
| 3,327,270 | 6/1967 | Garrison | 338—2 |
| 3,426,586 | 2/1969 | Kadlec | 73—88.5 |
| 3,494,181 | 2/1970 | Boelkins et al. | 73—88.5 |
| 3,521,484 | 7/1970 | Dybvad et al. | 73—88.5 |

RICHARD C. QUEISSER, Primary Examiner

J. WHALEN, Assistant Examiner

U.S. Cl. X.R.

73—88.5, 65